United States Patent [19]

Novi

[11] 4,331,171
[45] May 25, 1982

[54] EARTHQUAKE SHUT-OFF VALVE FOR GAS LINE

[76] Inventor: Sam Novi, 1686 Great Highway 4,, San Francisco, Calif. 94116

[21] Appl. No.: 228,100

[22] Filed: May 15, 1981

[51] Int. Cl.³ ............................................. F16K 17/36
[52] U.S. Cl. ........................................ 137/45; 137/38
[58] Field of Search ............................. 137/38, 39, 45

[56] References Cited

U.S. PATENT DOCUMENTS

| | | | |
|---|---|---|---|
| 2,585,316 | 2/1952 | Hobson | 137/38 |
| 2,927,592 | 3/1960 | Ferre | 137/38 |
| 3,747,616 | 7/1973 | Lloyd | 137/38 |
| 3,768,497 | 10/1973 | Mueller | 137/38 |
| 4,165,758 | 8/1979 | Douce | 137/38 |

*Primary Examiner*—Robert G. Nilson

*Attorney, Agent, or Firm*—Julian Caplan

[57] ABSTRACT

Earthquake tremors dislodge a pedestal-mounted ball which then blocks the outlet passage of a casing installed in a gas line. To make the device more sensitive, the pedestal is spring-supported in the casing. Further, several balls may be suspended from wires in such position that, when they sway because of tremor, they knock the shut-off ball from the pedestal. The ball may be knocked from the pedestal in an emergency by kicking or rapping it. Additionally, the pedestal may be mounted on horizontal ball bearings with an adjustable compressive force which makes the shut-off ball especially sensitive both to vertical and horizontal tremors. In a severe emergency, such as an earthquake, the device saves lives and property by minimizing potential leakage and explosion from ruptured pipes.

13 Claims, 5 Drawing Figures

EARTHQUAKE SHUT-OFF VALVE FOR GAS LINE

This invention relates to a new and improved shut-off valve for gas lines which is actuated by earthquake tremors.

A principal cause of fires following earthquakes is the presence of gas which may be ignited, resulting in explosions. Gas lines may be ruptured as a result of earthquakes, causing leakages which are an additional cause of explosions or asphyxiation. The present invention provides a device installed in a gas line to shut off gas flow automatically upon a tremor of sufficient magnitude to cause such damage occurring.

A particular feature of the invention is the fact that not only is it automatic, but also it is sensitive and the sensitivity is precision adjustable. Swaying motion during earthquake causes the suspended balls to knock the shut-off ball from its pedestal.

Further, the device is reasonable in cost of manufacture and installation and requires no maintenance. After it has closed following a tremor, it is conveniently and easily reset.

Although intended for installation outside buildings near meters, it may be installed within a building and may be installed above or below ground.

Heretofore, devices of this type have used balls mounted on pedestals which are dislodged by tremors to block gas flow passages. Among these prior art devices are those shown in U.S. Pat. Nos.: 1,679,929; 3,783,887; 3,747,616; 2,927,592 and 2,585,316. None of these prior disclosures, however, has the precision adjustability or swaying ball of the present invention nor do they have auxiliary means to dislodge the shut-off ball from its pedestal. Accordingly, the present invention has important advantages over these structures as hereinafter appears.

The device can be mass produced at reasonable cost. It is readily installed above or below ground outside buildings. It is thus readily accessible in an emergency so that it may be manually activated by striking it with a tool.

In accordance with the present invention, a ball is mounted on a pedestal having a flexible support. Two or more balls are mounted in proximity to the shut-off valve in such manner that they sway as a result of tremor and function to dislodge the shut-off valve ball from its pedestal. For such purpose, it is preferable that these balls be located below the level of the shut-off ball so that their swaying action tends to lift the ball off its pedestal.

Another feature of the present invention is the fact that the shut-off ball is mounted on a pedestal which rests on small balls of the type used in miniature ball bearings, which are supported by a base. The tightness between the pedestal and the ball bearings is adjustable, making the pedestal sensitivity to friction in horizontal earth tremors adjustable.

Another feature of the invention is that both the pedestal for the shut-off valve and for the knock-off valves heretofore mentioned are spring mounted to improve sensitivity to vertical motion.

Another feature of the invention is the use of a lining in the valve seat throat against which the shut-off ball seats tightly as gas pressure builds up behind the ball, thus insuring that there is complete blockage of the line. Line pressure behind the ball aids in seating the ball.

Another feature of the invention is the fact that a gas flow diverter is placed at the gas inlet port to prevent a sudden surge of gas flow when valves are opened from unintentionally dislodging the shut-off ball.

A still further feature of the invention is that it is useful in shutting off gaslines in emergencies other than earthquakes. Thus, a fireman may jar the valve in responding to fire and thus quickly shut off flow of gas in a broken pipe, etc.

Other objects of the present invention will become apparent upon reading the following specification and referring to the accompanying drawings in which similar characters of reference represent corresponding parts in each of the several views.

Figure 2:
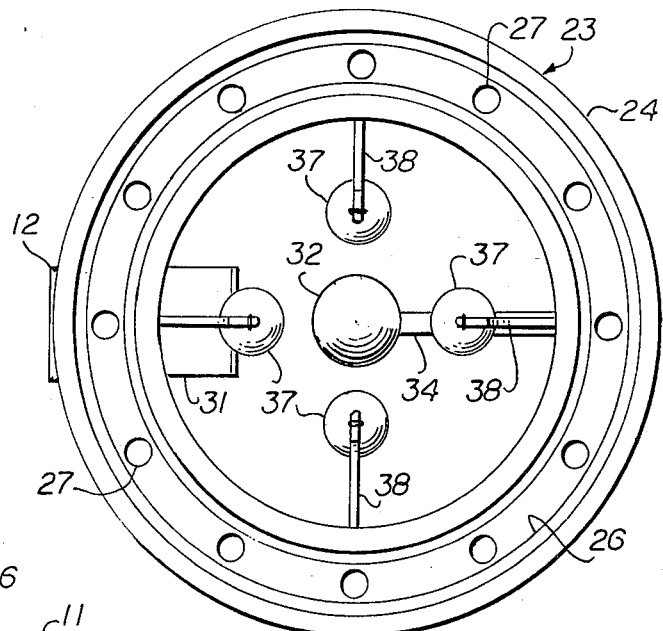
FIG. 2 is a sectional view taken substantially along the line 2—2 of FIG. 1.

The shut-off valve of the present invention employs a casing 11 which is subject to considerable modification. The casing shown in FIGS. 1 and 2 has an inlet 12 horizontally disposed and a vertical outlet 13 below the level of the inlet 12. The purpose of the device is to cut off flow from the inlet 12 to the outlet 13 when an earthquake tremor of a predetermined intensity occurs. Casing 11 shown in FIGS. 1 and 2 employs an upper casing section 16 having a somewhat domed top 17, a vertical cylindrical side 18 and an outward directed peripheral flange 19. Flange 19, on its lower side, has a downwardly-converging truncated ridge 21.

Lower casing section 23 has a peripheral flange 24, having a groove 26 on its top surface which mates with the ridge 21. Screws 27 threaded into flange 24 draw the casing portions 16 and 23 into tight engagement. To improve sealing of the casing sections, a sealant 28 or gasket may be installed in the groove 26. The lower casing 23 is here shown as convex, merging at its bottom into a throat 29. To prevent gas flow through the inlet 12 from unintentionally setting off the device, a deflector 31 is installed inside the inlet 12 to deflect the flow downward toward the outlet 13.

A ball 32 of steel, glass or a heavy, or weighted plastic material is used to shut off the device. Ball 32 is mounted on a horizontal pedestal 33 which is supported by a flexible support 34, attached to the lower casing 23. In one version of the present invention the throat 29 may be provided with a downward converging lining 36 of a cushioned material into which the ball 32 falls when it is dislodged from the pedestal 33 by a tremor, the ball 32 being imbedded in the resilient material 36 to insure that the flow is cut off.

To insure that ball 32 is dislodged from pedestal 33 when a tremor occurs, a plurality of balls 37 are suspended from resilient supports 38 fixed to casing section 23 by suspension from wires 39 or by other means. As observed in FIG. 1, the centers of balls 37 are below the center of ball 32. Hence, a swaying motion of balls 37 which occurs during a tremor intersects the ball 32 below the center thereof, tending to lift the same from the pedestal 33 and insure dislodgment.

Figure 1:
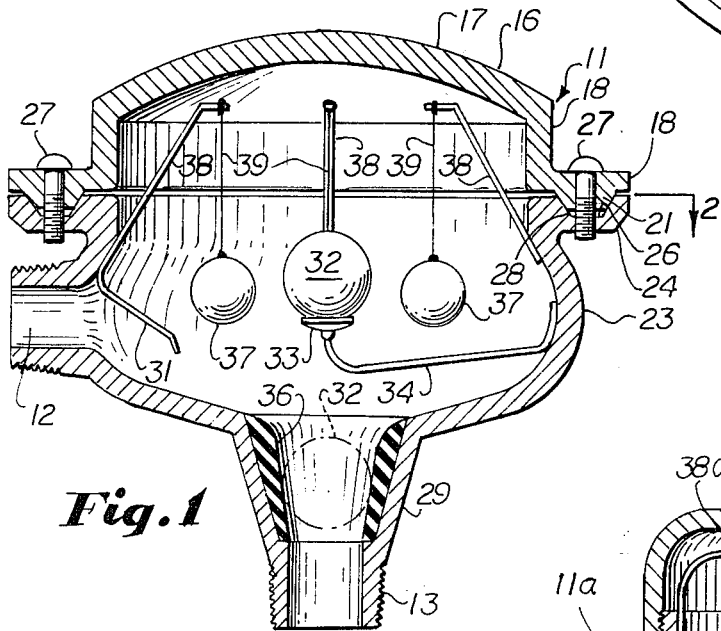
FIG. 1 is a vertical sectional view through a device in accordance with the present invention.
Figure 3:
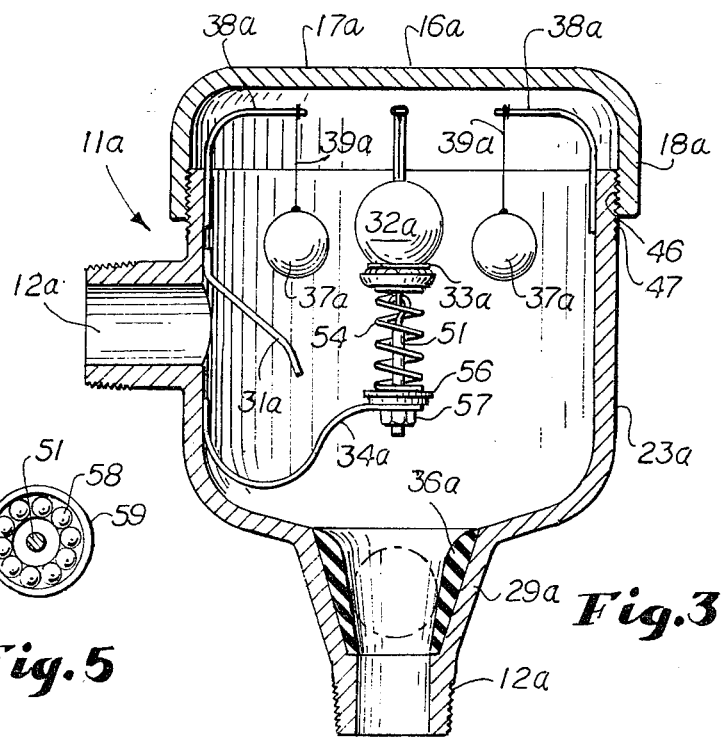
FIG. 3 is a view similar to FIG. 1 of a modified structure.
Figures 4, 5:
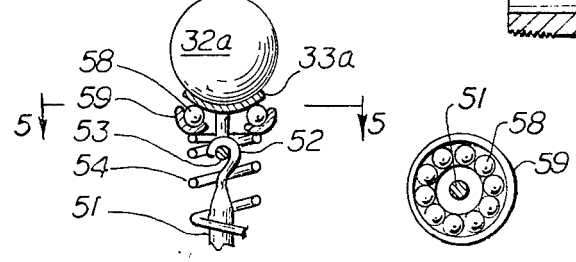
FIG. 4 is an enlarged sectional view of a portion of FIG. 3.
FIG. 5 is a fragmentary sectional view taken substantially along line 5—5 of FIG. 4.

FIGS. 3 and 4 disclose a modification of the device of FIG. 1. Upper casing section 16a has a top 17a and a vertical side 18a provided with internal threads 46. Lower casing section 23 has vertical sides 23a provided with external threads 47 which mate with the threads 46.

Balls 37a are supported in manner similar to the balls 37 of the preceeding modification. Ball 32a, however, is supported in a precision manner. Thus, a vertical stem 51 is formed with a hook 52 on its upper end which engages a hook 53 depending from concave pedestal 33a. A helical spring 54 surrounds stem 51 and is engaged at its bottom end by washer 56. Nut 57 is threaded onto the threaded lower end of stem 51 on the side of pedestal 34a opposite washer 56. A plurality of small balls 58 similar to those used in miniature ball bearings is interposed below the concave pedestal 33a and a concave cup 59 is located on top of the spring 54, annular cup 59 being former with a large central aperture for passage of hook 52. The lip of cup 59 is turned inward to retain balls 58. There is no direct contact between cup 59 and pedestal 33a. Accordingly, when nut 57 is tightened, the pedestal 33a is drawn together against the balls 58 and the possibility of the pedestal 33a rocking during a tremor is reduced. With the increased friction which results when the nut 57 is loosened, the space between the members 33a and 59 is increased, permitting the pedestal to rock relative to the balls 58 more freely. When a sudden upward vertical movement occurs, ball 32a depresses spring 54 and the reaction of the spring dislodges ball 32a. Hence, the device is more sensitive to tremors in a horizontal or vertical direction, when the nut 57 is loosened.

It will be noted that it is easy to check whether the casing 11 is level by observing whether ball 32 is equidistant from balls 37.

What is claimed is:

1. In a valve of the type operable to shut off fluid flow following earthquake tremors comprising a casing having a fluid inlet port and a fluid outlet port at the bottom of said casing, a first ball, a pedestal supported in said casing normally supporting said first ball above said outlet port, said first ball being dimensioned to close off said outlet port when dislodged from said pedestal, the improvement which comprises at least one second ball, means mounting said second ball within said casing for movement initiated by tremors in a path to dislodge said first ball from said pedestal.

2. A valve according to claim 1 in which said means comprises a filament attached at its lower end to said second ball and a support for the upper end of said filament, said support being fixed to the inside of said casing.

3. A valve according to claim 1 in which said second ball is below the level of said first ball.

4. A valve according to claim 1 which further comprises at least one third ball supported in the manner of said second ball and displaced from said second ball.

5. A valve according to claim 1 which further comprises a flexible support for said pedestal which permits said pedestal to vibrate during tremors.

6. A valve according to claim 1 which further comprises a downwardly converging resilient throat at said outlet port.

7. A valve according to claim 1 in which said casing is formed in two parts, with a fluid-tight joint to permit access to the interior of said valve to re-set said first ball on said pedestal.

8. A valve according to claim 7 in which a first said part is formed with a circular first flange, said first flange being formed with a circumferential groove having a bottom and inwardly converging sides, and a second said part is formed with a circular second flange, said second flange being formed with a bead complementary to said groove and which further comprises means for drawing said flanges together to seal said bead and groove together, said flanges and said last-mentioned means comprising said fluid-tight joint.

9. A valve according to claim 1 in which said pedestal comprises a concave member complementary to the bottom of said first ball, an upward-concave cup, a plurality of ball bearings in said cup supporting said concave member, and resilient means biasing said cup and concave member together with said ballbearings interposed.

10. A valve according to claim 8 in which the force of said resilient means is adjustable to adjust the sensitivity of said concave member to tilting during tremors.

11. In a valve of the type operable to shut off fluid flow following earthquake tremors comprising a casing having a fluid inlet port and a fluid outlet port at the bottom of said casing, a ball, a pedestal for said ball supported in said casing and support means for said pedestal, said ball being dimensioned to close off said outlet port when dislodged from said pedestal, the improvement in which said support means comprises a concave member complementary to the bottom of said ball, an upward concave cup, a plurality of ball bearings in said cup supporting said concave member, and resilient means biasing said cup and concave member together with said ball bearings interposed.

12. A valve according to claim 11 in which the force of said resilient means is adjustable to adjust the sensitivity of said concave member to tilting during earthquate tremors.

13. A valve according to claim 11 in which said cup member is formed with an aperture, a first hook on the bottom of said cup extending through said aperture, a stem, a second hook on the upper end of said stem engaging said first hook, a pedestal support fixed to said casing and formed to engage the lower end of said stem and a spring surrounding said stem between said pedestal support and said cup member.

* * * * *